United States Patent [19]
Ogino

[11] 4,239,340
[45] Dec. 16, 1980

[54] CONVERSION LENS SYSTEM

[75] Inventor: Shuji Ogino, Osaka, Japan

[73] Assignee: Minolta Camera Kabushiki Kaisha, Osaka, Japan

[21] Appl. No.: 947,736

[22] Filed: Oct. 2, 1978

[30] Foreign Application Priority Data

Oct. 4, 1977 [JP] Japan ............................. 52-119793

[51] Int. Cl.$^3$ ........................ G02B 9/60; G02B 9/62; G02B 9/64
[52] U.S. Cl. ............................. 350/214; 350/183; 350/215; 350/216
[58] Field of Search ............... 350/214, 215, 216, 176, 350/177, 183

[56] References Cited

U.S. PATENT DOCUMENTS

| | | | |
|---|---|---|---|
| 3,877,796 | 4/1975 | Yabe et al. | 350/176 X |
| 4,126,378 | 11/1978 | Ogino | 350/214 |
| 4,154,508 | 5/1979 | Nakamura | 350/214 X |

FOREIGN PATENT DOCUMENTS 46-41341  7/1971  Japan ................................. 350/215

Primary Examiner—Paul A. Sacher
Attorney, Agent, or Firm—Jackson, Jones & Price

[57] ABSTRACT

A conversion lens system to be attached to an objective lens system at the image side thereof for converting the focal length of the objective lens system into a greater value is provided. The conversion lens system has a negative focal length and comprises seven single lens elements consisting of a first negative meniscus lens element convex to the object side, a second biconvex lens element, a third biconcave lens element, a fourth biconvex lens element, a fifth negative lens element having a concave front surface, a sixth positive lens element having a convex rear surface and a seventh biconcave lens element. All of the seven lens elements may be separated from the others, or alternatively, at least two of the second to fourth lens elements may be cemented to each other.

12 Claims, 16 Drawing Figures

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

CONVERSION LENS SYSTEM

BACKGROUND OF THE INVENTION

1. Field of the Invention

The present invention relates to a conversion lens system and more particularly to a conversion lens system to be attached to an exchangeable objective lens system of a camera at the image side thereof for converting the focal length of the objective lens system into a greater value.

2. Description of the Prior Art

In a conversion lens system of a type which converts the focal length of an original lens system into a greater value, there exists a general problem in that various aberrations of the original lens system are also apt to be converted into greater values when the converter lens system is attached to the original lens system. Further, a remarkable astigmatic difference generally occurs to result in a poor image at the marginal area of the focal plane since the Petzval sum of the original objective lens system with the conversion lens system attached to changed into a considerable negative value because of the negative refractive power of the conversion lens system. There is, accordingly, a demand in the prior art to provide a conversion lens system improved with respect to the aberration problems.

By the way, Japanese Patent Application laid open to the public inspection under No. 52-109930, which corresponds to U.S. Pat. No. 4,154,508, is cited in that it disclosed conversion lens systems having seven single lens elements. In each of the drawings of the Japanese Patent Application, the rear side lens elements beginning from surface $r_1$ constitute a conversion lens system. Some of the lens elements in the conversion lens system are cemented to each other. Further, the specification of the Japanese Patent Application says that the conversion lens system comprises a negative front lens group consisting of a first positive sub-group, a second negative sub-group and a third positive sub-group, and a positive rear lens group consisting of a fourth positive sub-group and a fifth negative sub-group.

SUMMARY OF THE INVENTION

An object of the present invention is to provide an improved conversion lens system capable of converting the focal length of an original objective lens system to a different value without causing undesirable aberrations.

Another object of the present invention is to provide a conversion lens system capable of converting the focal length of an original objective lens system with the aberration correction as accomplished in the original objective lens system substantially maintained.

According to the present invention, the conversion lens system comprises seven single lens elements consisting, from the object to the image side, of a first negative meniscus lens element convex to the object side; a second biconvex lens element; a third biconcave lens element; a fourth bioconvex lens element; a fifth negative lens element, the absolute value of the radius of curvature of the image side surface of the fifth element being greater than that of the object side surface of the fifth element; a sixth positive lens element, the absolute value of the radius of curvature of the object side surface of the sixth element being greater than that of the image side surface of the sixth element; and, finally, a seventh biconcave lens element.

The above mentioned first to fifth elements constitute a front negative lens group. More specifically, the front negative lens group is divided into three sub-groups, which are a first negative sub-group by the first element, a second positive sub-group by the second to fourth elements and a third negative sub-group by the fifth element. On the other hand, the sixth and seventh elements constitute a rear positive lens group.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

Figure 1:
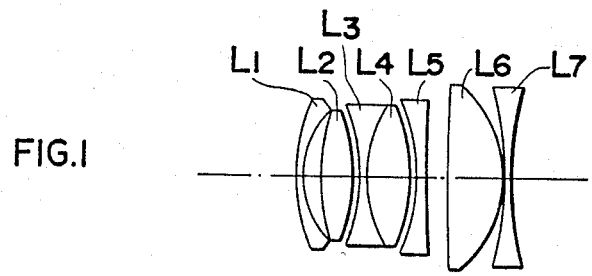
FIG. 1 is a schematic cross-sectional view of a first embodiment of the present invnetion.
Figure 2A:
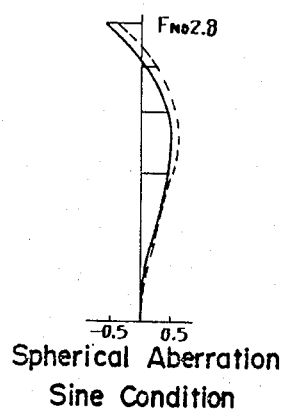
FIGS. 2a, 2b and 2c are respectively graphical plots of the aberrations of the first embodiment.
Figure 2B:
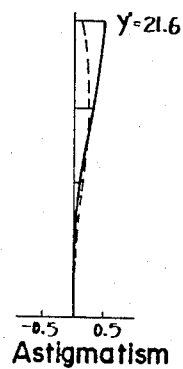
Figure 2C:
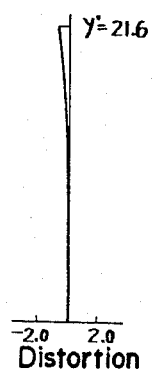

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a conversion lens system improved with respect to the aberration problems.

In the accompanying drawings which supplement the following tables, the lenses in accordance with the present invention are illustrated diagrammatically. As usual, in conventional lens diagrams, light is assumed to travel from left to right. The individual single lens elements are designated by the letter L with a subscript number corresponding to the consecutive numbers of the lens elements from image to object side.

In the Tables, the radii of curvature of the lenses are indicated by r, with a subscript corresponding to consecutive numbers of the lens elements. The axial distance d along the optical axis includes both the axial spacings between the lens elements and the thickness of the lens elements. All linear dimensions are given in normalized values with reference to an equivalent focal length of $f = -100.0$. Finally, the refractive index N and Abbe number $\nu$ are provided. Since the specific lens parameters are provided herein to meet the requirements of a full disclosure adequate to convey the present invention to a lens designer, they should not be construed as limiting to any specific lens design as set forth in an individual embodiment.

Four specific embodiments of the present invention are disclosed respectively in FIGS. 1, 3, 5 and 7. In each of these conversion lens systems, seven single lens elements consist, from the object to the image side, of a first negative meniscus lens element $L_1$ convex to the object side; a second biconvex lens element $L_2$; a third biconcave lens element $L_3$; a fourth biconvex lens element $L_4$; a fifth negative lens element $L_5$, the absolute value of the radius of curvature of the image side surface of the fifth element $L_5$ being greater than that of the object side surface of the fifth element $L_5$; a sixth positive lens element $L_6$, the absolute value of the radius of curvature of the object side surface of the sixth element $L_6$ being greater than that of the image of the imade surface of the sixth element $L_6$; and, finally, a seventh biconcave lens element $L_7$.

It should be noted that the conversion lens systems in the Figures each have a negative focal length. Therefore, an objective lens system of a positive focal length is to be located at the object side of the conversion lens system in the Figures to provide a practical image formation.

The above described conversion lens system of the present invention is divided into two groups in view of the optical function. One of them is a front negative group consisting of the first to fifth elements, $L_1$ to $L_5$. And the other is a rear positive group consisting of the sixth and seventh elements, $L_6$ and $L_7$. The front negative group, $L_1$ to $L_5$, is further divided into three sub-groups consisting of first negative sub-group, second positive sub-group and a third negative sub-group. The first element $L_1$ corresponds to the first sub-group, the second to fourth elements, $L_2$ to $L_4$, to the second sub-group, and the fifth element $L_5$ to the third sub-group, respectively.

The negative meniscus lens element $L_1$ characterizing the first sub-group is for correcting positive coma by means of its image side surface which considerably refracts the upper ray of an off-axial pencil. On the contrary, the axial pencil is not caused any substantial refraction by the first sub-group since the negative meniscus lens element $L_1$ is convex to the object side.

The second sub-group is characterized by a construction in which a biconcave lens $L_3$ of high refractive index is sandwiched between a pair of biconvex lenses $L_2$ and $L_4$ of low refractive index to effectively prevent an increase of the absolute value of the negative Petzval Sum. Further, it should be noted that the adjacent surfaces of the elements $L_2$ to $L_4$ are respectively of almost equal curvatures as seen from the Figures. This is for cancelling the aberrations generated by the adjacent surfaces. Thus, the serious problem of the increased astigmatic difference inherent in the use of conventional conversion lens system is solved to provide a conversion lens system of improved field curvature.

The negative lens element $L_5$ characterizes the third subgroup and is for correcting negative deviation of the spherical aberration, which is caused by the second sub-group, by means of the concave front surface of the element $L_5$. Therefore, a conversion lens of a greater effective aperture ratio is possible according to the present invention.

Figure 3:
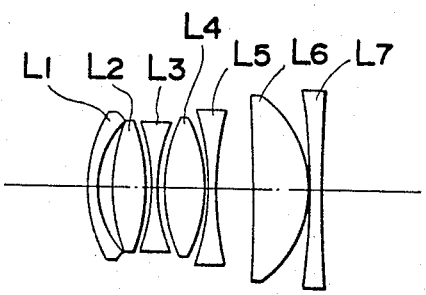
FIG. 3 is a schematic cross-sectional view of a second embodiment of the present invention.
Figure 4A:
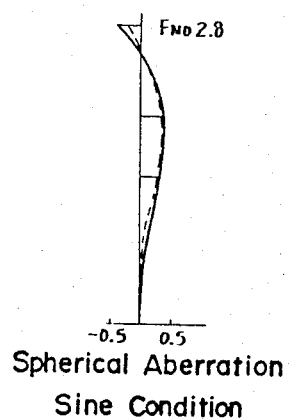
FIGS. 4a, 4b and 4c are respectively graphical plots of the aberrations of the second embodiment.
Figure 4B:
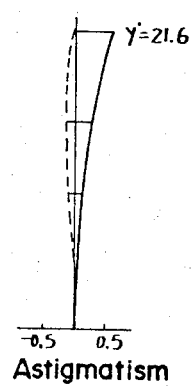
Figure 4C:
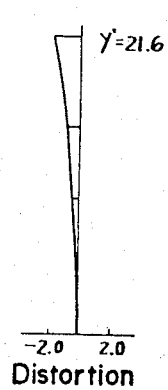
Figure 5:
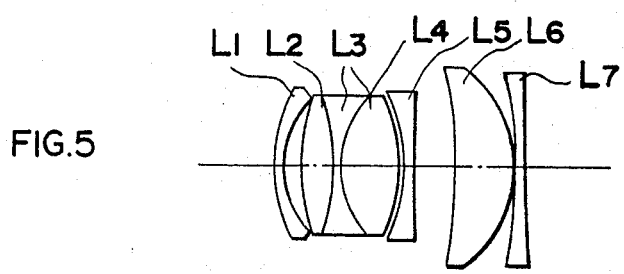
FIG. 5 is a schematic cross-sectional view of a third embodiment of the present invention.
Figure 6A:
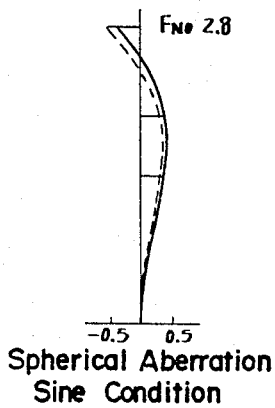
FIGS. 6a, 6b and 6c are respectively graphical plots of the aberrations of the third embodiment.
Figure 6B:
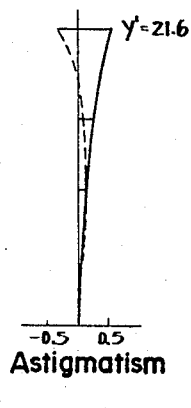
Figure 6C:
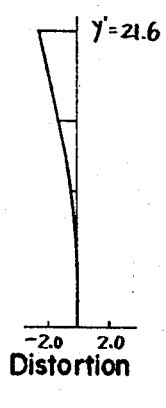
Figure 7:
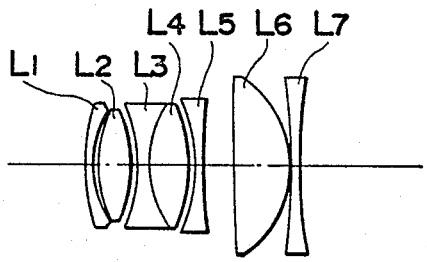
FIG. 7 is a schematic cross-sectional view of the fourth embodiment of the present invention.
Figure 8A:
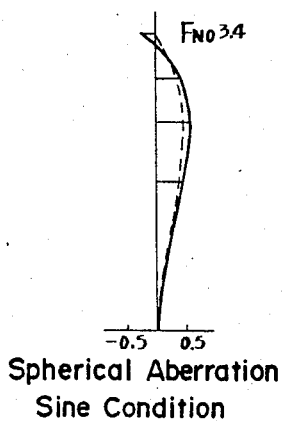
FIGS. 8a, 8b and 8c are respectively graphical plots of the aberrations of the fourth embodiment.
Figure 8B:
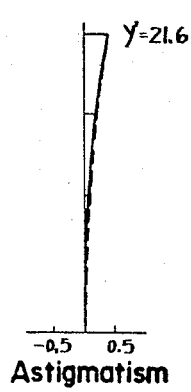
Figure 8C:

With respect to the above second sub-group, $L_2$ to $L_4$, in the front negative group, various constructions are possible. As shown in FIG. 3, the elements $L_2$ to $L_4$ each are separated from the others. Alternatively, at least two of the elements $L_2$ to $L_4$ can be cemented to each other as shown in FIGS. 1, 5 and 7.

The rear positive group is spaced from the negative front group and is characterized by a pair of single lens elements $L_6$ and $L_7$ separated from each other. For the purpose of improving lateral chromatic aberration and field curvature, the positive sixth element $L_6$ is made of a glass material of low refractive index and low Abbe number, while the negative seventh element $L_7$ is of high refractive index and relatively high Abbe number.

According to the present invention, it is further recommended to fulfill the following conditions:

$$0.1 < |f_{1,2,3,4,5}|/f_{6,7} < 0.7 \tag{1}$$

$$f_{1,2,3,4,5} < 0 \tag{2}$$

$$f_{6,7} > 0 \tag{3}$$

$$\overline{N}_N > 1.7, \overline{N}_P < 1.6 \tag{4}$$

wherein:

$f_{1,2,3,4,5}$ represents the over-all focal length of the first to fifth lens elements $L_1$ to $L_5$;

$f_{6,7}$ represents the over-all focal length of the sixth and seventh lens elements $L_6$ and $L_7$;

$\overline{N}_N$ represents the average of refractive indices for the negative lens elements; and $\overline{N}_P$ represents the average of refractive indices for the positive lens elements.

By adherence to the lower limit of condition (1) and the conditions (2) and (3), the object principal point of the conversion lens system is located further toward the object side, whereby the negative focal length of said conversion lens is prevented from being short. Assuming that the distance between the image principal object of an original objective lens and the object principal point of the conversion lens is e and the focal length of the original objective lens is f, the focal length $f_c$ of the conversion lens in case of a ratio of magnification of 2 is given by the following relation: $f_c = -2f + 2e$. The smaller the value of e, that is to say the further the object principal point of the conversion lens is displaced toward the object side, the greater the absolute value of the negative focal length $f_c$ of the conversion lens system, with the result that aberration correction is facilitated. On the contrary, with a small absolute value of $f_c$, the Petzval sum, in particular, assumes a large value in the negative direction, making aberration correction difficult. Therefore, if the lower limit of condition (1) and the conditions (2) and (3) are not adhered to, the astigmatic difference is large and, to correct for this difference, the number of lens elements constituting the lens system must be significantly increased and, hence, a cost increase is inevitable. The upper limit of condition (1) is a condition for a balanced correction of spherical aberration and coma. Above this limit, practically only a lens system with a low aperture ratio is obtained.

The condition (4) is for maintaining the Petzval sum at a suitable value. Thus, in this invention, an improvement in the Petzval sum is sought by selecting biconvex lenses made of low refractive index glass for the second lens element $L_2$ and the fourth lens element $L_4$, and a biconcave lens made of high refractive index glass for the third lens element $L_3$. Further, glass material of low refractive index is used for another positive lens element $L_6$ and glass materials of high refractive indices for other negative lens elements $L_1$, $L_5$ and $L_7$. Therefore, if the condition (4) is not satisfied, the astigmatic difference is so large that the marginal image plane quality will deteriorate considerably.

The following description pertains to the aberration correction made with the conversion lens. Taking a conversion lens with a ratio of magnification of 2 as an example, the aberration of the original lens system is amplified two-fold in lateral aberrations and four-fold in longitudinal aberrations even if the aberration correction of the attached conversion lens is by itself perfect, thus resulting in a deteriorated performance. Therefore, the aberration correction of a conversion lens system is preferably made to offset the aberration of the original lens system rather than made close to a perfect correction state by itself. Taking spherical aberration as an example, the original objective lens, in many instances, has a certain negative value for zonal rays and is equal to zero or has a positive value for marginal rays. In attaching a conversion lens system to such an original lens system, to prevent the spherical aberration from being amplified four-fold as mentioned earlier and to cancel the spherical aberration, it is necessary that an aberration correction be made to give a positive value for zonal rays and a value of zero or a negative value for marginal rays. Moreover, practically the best image plane of an original objective lens system is negatively displaced, though to a limited extent, from the Gauss image plane. Therefore, in order that this displacement may be cancelled, it is advantageous that the best image plane be positively displaced with respect to the conversion lens system. In the embodiments of this invention, aberration corrections are made taking into account the above considerations. For the purpose of clearly showing the above discussed aberration corrections in the present invention, FIGS. 2, 4, 6 and 8 respectively corresponding to the first to fourth embodiments each are plotted with respect to the aberrations of the conversion lens system by itself.

Following Tables 1 to 4 show the first to fourth embodiments of this invention, respectively.

TABLE 1

(Embodiment 1)
$f = -100.0$ Ratio of Magnification = 1.98
Effective F Number = 2.8

| | Radius of Curvature | | Axial Distance | | Refractive Index | | Abbe Number |
|---|---|---|---|---|---|---|---|
| $r_1$ | 44.276 | | | | | | |
| | | $d_1$ | 1.935 | $N_1$ | 1.7425 | $v_1$ | 52.5 |
| $r_2$ | 22.373 | | | | | | |
| | | $d_2$ | 3.72 | | | | |
| $r_3$ | 41.917 | | | | | | |
| | | $d_3$ | 8.483 | $N_2$ | 1.5927 | $v_2$ | 35.3 |
| $r_4$ | −45.306 | | | | | | |
| | | $d_4$ | 1.488 | | | | |
| $r_5$ | −42.970 | | | | | | |
| | | $d_5$ | 1.935 | $N_3$ | 1.7725 | $v_3$ | 49.8 |
| $r_6$ | 29.737 | | | | | | |
| | | $d_6$ | 11.162 | $N_4$ | 1.5407 | $v_4$ | 46.8 |
| $r_7$ | −42.090 | | | | | | |
| | | $d_7$ | 1.488 | | | | |
| $r_8$ | −52.109 | | | | | | |
| | | $d_8$ | 1.935 | $N_5$ | 1.744 | $v_5$ | 44.9 |
| $r_9$ | 393.49 | | | | | | |
| | | $d_9$ | 5.305 | | | | |
| $r_{10}$ | 563.01 | | | | | | |
| | | $d_{10}$ | 13.692 | $N_6$ | 1.4875 | $v_6$ | 70.1 |
| $r_{11}$ | −27.467 | | | | | | |
| | | $d_{11}$ | 0.223 | | | | |
| $r_{12}$ | −108.510 | | | | | | |
| | | $d_{12}$ | 2.232 | $N_7$ | 1.805 | $v_7$ | 41.0 |
| $r_{13}$ | 144.116 | | | | | | |
| | | $f_{1,2,3,4,5} = -56.44$ | | | | | |

TABLE 1-continued (Embodiment 1)
$f = -100.0$ Ratio of Magnification = 1.98
Effective F Number = 2.8

| Radius of Curvature | Axial Distance | Refractive Index | Abbe Number |
|---|---|---|---|
| $f_{6,7} = 175.37$ | | | |

TABLE 2

(Embodiment 2)
$f = -100.0$ Ratio of Magnification = 2.0
Effective F Number = 2.8

| | Radius of Curvature | | Axial Distance | | Refractive Index | | Abbe Number |
|---|---|---|---|---|---|---|---|
| $r_1$ | 27.244 | | | | | | |
| | | $d_1$ | 1.423 | $N_1$ | 1.7425 | $v_1$ | 52.5 |
| $r_2$ | 16.142 | | | | | | |
| | | $d_2$ | 2.955 | | | | |
| $r_3$ | 29.602 | | | | | | |
| | | $d_3$ | 5.8 | $N_2$ | 1.5927 | $v_2$ | 35.3 |
| $r_4$ | −37.279 | | | | | | |
| | | $d_4$ | 1.094 | | | | |
| $r_5$ | −34.600 | | | | | | |
| | | $d_5$ | 1.423 | $N_3$ | 1.7725 | $v_3$ | 49.8 |
| $r_6$ | 24.100 | | | | | | |
| | | $d_6$ | 1.094 | | | | |
| $r_7$ | 31.412 | | | | | | |
| | | $d_7$ | 7.114 | $N_4$ | 1.5407 | $v_4$ | 46.8 |
| $r_8$ | −30.818 | | | | | | |
| | | $d_8$ | 1.094 | | | | |
| $r_9$ | −40.340 | | | | | | |
| | | $d_9$ | 1.423 | $N_5$ | 1.744 | $v_5$ | 44.9 |
| $r_{10}$ | 73.653 | | | | | | |
| | | $d_{10}$ | 6.909 | | | | |
| $r_{11}$ | −340.74 | | | | | | |
| | | $d_{11}$ | 10.397 | $N_6$ | 1.4875 | $v_6$ | 70.1 |
| $r_{12}$ | −20.041 | | | | | | |
| | | $d_{12}$ | 0.164 | | | | |
| $r_{13}$ | −99.818 | | | | | | |
| | | $d_{13}$ | 1.642 | $N_7$ | 1.805 | $v_7$ | 41.0 |
| $r_{14}$ | 342.01 | | | | | | |
| | | $f_{1,2,3,4,5} = -33.59$ | | | | | |
| | | $f_{6,7} = 78.82$ | | | | | |

TABLE 3

(Embodiment 3)
$f = -100.0$ Ratio of Magnification = 2.0
Effective F Number = 2.8

| | Radius of Curvature | | Axial Distance | | Refractive Index | | Abbe Number |
|---|---|---|---|---|---|---|---|
| $r_1$ | 31.227 | | | | | | |
| | | $d_1$ | 1.493 | $N_1$ | 1.7425 | $v_1$ | 52.5 |
| $r_2$ | 17.578 | | | | | | |
| | | $d_2$ | 3.56 | | | | |
| $r_3$ | 41.296 | | | | | | |
| | | $d_3$ | 6.087 | $N_2$ | 1.5927 | $v_2$ | 35.3 |
| $r_4$ | −53.113 | | | | | | |
| | | $d_4$ | 1.493 | $N_3$ | 1.7725 | $v_3$ | 49.8 |
| $r_5$ | 18.619 | | | | | | |
| | | $d_5$ | 11.551 | $N_4$ | 1.5814 | $v_4$ | 40.3 |
| $r_6$ | −25.868 | | | | | | |
| | | $d_6$ | 1.149 | | | | |
| $r_7$ | −29.543 | | | | | | |
| | | $d_7$ | 1.493 | $N_5$ | 1.744 | $v_5$ | 44.9 |
| $r_8$ | −780.34 | | | | | | |
| | | $d_8$ | 8.494 | | | | |
| $r_9$ | −83.436 | | | | | | |
| | | $d_9$ | 10.566 | $N_6$ | 1.5111 | $v_6$ | 60.6 |
| $r_{10}$ | −22.310 | | | | | | |
| | | $d_{10}$ | 0.172 | | | | |
| $r_{11}$ | −82.122 | | | | | | |
| | | $d_{11}$ | 1.723 | $N_7$ | 1.8074 | $v_7$ | 31.6 |
| $r_{12}$ | 412.76 | | | | | | |
| | | $f_{1,2,3,4,5} = -53.05$ | | | | | |
| | | $f_{6,7} = 181.07$ | | | | | |

TABLE 4

(Embodiment 4)

$f = -100.0$  Ratio of Magnification $= 2.0$
Effective F Number $= 3.4$

| Radius of Curvature | | Axial Distance | | Refractive Index | | Abbe Number |
|---|---|---|---|---|---|---|
| $r_1$ | 42.369 | | | | | |
| | | $d_1$ | 1.557 | $N_1$ 1.7725 | $\nu_1$ | 49.8 |
| $r_2$ | 20.641 | | | | | |
| | | $d_2$ | 1.765 | | | |
| $r_3$ | 33.613 | | | | | |
| | | $d_3$ | 6.488 | $N_2$ 1.5927 | $\nu_2$ | 35.3 |
| $r_4$ | −37.957 | | | | | |
| | | $d_4$ | 1.817 | | | |
| $r_5$ | −33.940 | | | | | |
| | | $d_5$ | 2.595 | $N_3$ 1.7725 | $\nu_3$ | 49.8 |
| $r_6$ | 26.100 | | | | | |
| | | $d_6$ | 8.954 | $N_4$ 1.5407 | $\nu_4$ | 46.8 |
| $r_7$ | −34.219 | | | | | |
| | | $d_7$ | 1.298 | | | |
| $r_8$ | −38.141 | | | | | |
| | | $d_8$ | 1.557 | $N_5$ 1.744 | $\nu_5$ | 44.9 |
| $r_9$ | 198.025 | | | | | |
| | | $d_9$ | 6.669 | | | |
| $r_{10}$ | 448.88 | | | | | |
| | | $d_{10}$ | 11.938 | $N_6$ 1.4875 | $\nu_6$ | 70.1 |
| $r_{11}$ | −24.693 | | | | | |
| | | $d_{11}$ | 0.195 | | | |
| $r_{12}$ | −173.043 | | | | | |
| | | $d_{12}$ | 1.946 | $N_7$ 1.805 | $\nu_7$ | 41.0 |
| $r_{13}$ | 130.653 | | | | | |

$f_{1,2,3,4,5} = -40.92$
$f_{6,7} = 99.14$

By adhering to the parameters and design considerations set forth in the above specification, a lens designer in the optical field is capable of providing a conversion lens system. While the parameters of the present invention can be found in the above examples, the examples should not be considered limiting but rather illustrative of the advantages of the present invention. Accordingly, the parameters of the present invention should be measured solely from the following claims.

What is claimed is:

1. A conversion lens system of a negative total focal length to be attached to an exchangeable objective lens system at the image side thereof for converting the focal length of the objective lens system into a greater value, which conversion lens system is of seven single lens elements comprising:
   a first negative meniscus lens element convex to the object side;
   a second biconvex lens element located at the image side of the first lens element;
   a third biconcave lens element located at the image side of the second element;
   a fourth biconvex lens element located at the image side of the third element;
   a fifth negative lens element located at the image side of the fourth element, the absolute value of the radius of curvature of the image side of the fifth element being greater than that of the object side surface of the fifth element;
   a sixth positive lens element located at the image side of the fifth element, the absolute value of the radius of the curvature of the object side surface of the sixth element being greater than that of the image side surface of the sixth element; and
   a seventh biconcave lens element located at the image side of the sixth element.

2. The invention of claim 1, wherein the first to seventh elements each are separated from the others, respectively.

3. The invention of claim 1, wherein at least two of the second to fourth elements are cemented to each other and the first, fifth sixth and seventh elements each are separated from the others, respectively.

4. The invention of claim 3, wherein the third and fourth elements are cemented to each other.

5. The invention of claim 3, wherein the second and fourth elements are cemented to the both side surfaces of the third element, respectively.

6. The invention of claim 1 wherein the refractive index of the seventh lens element is higher than each of the other six lens elements.

7. A conversion lens system comprising the following design parameters:

$f = -100.0$  Ratio of Magnification $= 1.98$
Effective F Number $= 2.8$

| Radius of Curvature | | Axial Distance | | Refractive Index | | Abbe Number |
|---|---|---|---|---|---|---|
| $r_1$ | 44.276 | | | | | |
| | | $d_1$ | 1.935 | $N_1$ 1.7425 | $\nu_1$ | 52.5 |
| $r_2$ | 22.373 | | | | | |
| | | $d_2$ | 3.72 | | | |
| $r_3$ | 41.917 | | | | | |
| | | $d_3$ | 8.483 | $N_2$ 1.5927 | $\nu_2$ | 35.3 |
| $r_4$ | −45.306 | | | | | |
| | | $d_4$ | 1.488 | | | |
| $r_5$ | −42.970 | | | | | |
| | | $d_5$ | 1.935 | $N_3$ 1.7725 | $\nu_3$ | 49.8 |
| $r_6$ | 29.737 | | | | | |
| | | $d_6$ | 11.162 | $N_4$ 1.5407 | $\nu_4$ | 46.8 |
| $r_7$ | −42.090 | | | | | |
| | | $d_7$ | 1.488 | | | |
| $r_8$ | −52.109 | | | | | |
| | | $d_8$ | 1.935 | $N_5$ 1.744 | $\nu_5$ | 44.9 |
| $r_9$ | 393.49 | | | | | |
| | | $d_9$ | 5.305 | | | |
| $r_{10}$ | 563.01 | | | | | |
| | | $d_{10}$ | 13.692 | $N_6$ 1.4875 | $\nu_6$ | 70.1 |
| $r_{11}$ | −27.467 | | | | | |
| | | $d_{11}$ | 0.223 | | | |
| $r_{12}$ | −108.510 | | | | | |
| | | $d_{12}$ | 2.232 | $N_7$ 1.805 | $\nu_7$ | 41.0 |
| $r_{13}$ | 144.116 | | | | | |

8. A conversion lens system comprising the following design parameters;

$f = -100.0$  Ratio of Magnification $= 2.0$
Effective F Number $= 2.8$

| Radius of Curvature | | Axial Distance | | Refractive Index | | Abbe Number |
|---|---|---|---|---|---|---|
| $r_1$ | 27.244 | | | | | |
| | | $d_1$ | 1.423 | $N_1$ 1.7425 | $\nu_1$ | 52.5 |
| $r_2$ | 16.142 | | | | | |
| | | $d_2$ | 2.955 | | | |
| $r_3$ | 29.602 | | | | | |
| | | $d_3$ | 5.8 | $N_2$ 1.5927 | $\nu_2$ | 35.3 |
| $r_4$ | −37.279 | | | | | |
| | | $d_4$ | 1.094 | | | |
| $r_5$ | −34.600 | | | | | |
| | | $d_5$ | 1.423 | $N_3$ 1.7725 | $\nu_3$ | 49.8 |
| $r_6$ | 24.100 | | | | | |
| | | $d_6$ | 1.094 | | | |
| $r_7$ | 31.412 | | | | | |
| | | $d_7$ | 7.114 | $N_4$ 1.5407 | $\nu_4$ | 46.8 |
| $r_8$ | −30.818 | | | | | |
| | | $d_8$ | 1.094 | | | |
| $r_9$ | −40.340 | | | | | |
| | | $d_9$ | 1.423 | $N_5$ 1.744 | $\nu_5$ | 44.9 |
| $r_{10}$ | 73.653 | | | | | |
| | | $d_{10}$ | 6.909 | | | |

-continued

| | f = −100.0 Ratio of Magnification = 2.0 Effective F Number = 2.8 | | | | | |
|---|---|---|---|---|---|---|
| Radius of Curvature | | Axial Distance | | Refractive Index | | Abbe Number |
| $r_{11}$  −340.74 | | | | | | |
| | $d_{11}$ | 10.397 | $N_6$ | 1.4875 | $\nu_6$ | 70.1 |
| $r_{12}$  −20.041 | | | | | | |
| | $d_{12}$ | 0.164 | | | | |
| $R_{13}$  −99.818 | | | | | | |
| | $d_{13}$ | 1.642 | $N_7$ | 1.805 | $\nu_7$ | 41.0 |
| $r_{14}$  342.01 | | | | | | |

9. A conversion lens system comprising the following design parameters;

| | f = −100.0 Ratio of Magnification = 2.0 Effective F Number = 2.8 | | | | | |
|---|---|---|---|---|---|---|
| Radius of Curvature | | Axial Distance | | Refractive Index | | Abbe Number |
| $r_1$  31.227 | | | | | | |
| | $d_1$ | 1.493 | $N_1$ | 1.7425 | $\nu_1$ | 52.5 |
| $r_2$  17.578 | | | | | | |
| | $d_2$ | 3.56 | | | | |
| $r_3$  41.296 | | | | | | |
| | $d_3$ | 6.087 | $N_2$ | 1.5927 | $\nu_2$ | 35.3 |
| $r_4$  −53.113 | | | | | | |
| | $d_4$ | 1.493 | $N_3$ | 1.7725 | $\nu_3$ | 49.8 |
| $r_5$  18.619 | | | | | | |
| | $d_5$ | 11.551 | $N_4$ | 1.5814 | $\nu_4$ | 40.3 |
| $r_6$  −25.868 | | | | | | |
| | $d_6$ | 1.149 | | | | |
| $r_7$  −29.543 | | | | | | |
| | $d_7$ | 1.493 | $N_5$ | 1.744 | $\nu_5$ | 44.9 |
| $r_8$  −780.34 | | | | | | |
| | $d_8$ | 8.494 | | | | |
| $r_9$  −83.436 | | | | | | |
| | $d_9$ | 10.566 | $N_6$ | 1.5111 | $\nu_6$ | 60.6 |
| $r_{10}$  −22.310 | | | | | | |
| | $d_{10}$ | 0.172 | | | | |

-continued

| | f = −100.0 Ratio of Magnification = 2.0 Effective F Number = 2.8 | | | | | |
|---|---|---|---|---|---|---|
| Radius of Curvature | | Axial Distance | | Refractive Index | | Abbe Number |
| $r_{11}$  −82.122 | | | | | | |
| | $d_{11}$ | 1.723 | $N_7$ | 1.8074 | $\nu_7$ | 31.6 |
| $r_{12}$  412.76 | | | | | | |

10. A conversion lens system comprising the following design parameters;

| | f = −100.0 Ratio of Magnification = 2.0 Effective F Number = 3.4 | | | | | |
|---|---|---|---|---|---|---|
| Radius of Curvature | | Axial Distance | | Refractive Index | | Abbe Number |
| $r_1$  42.369 | | | | | | |
| | $d_1$ | 1.557 | $N_1$ | 1.7725 | $\nu_1$ | 49.8 |
| $r_2$  20.641 | | | | | | |
| | $d_2$ | 1.765 | | | | |
| $r_3$  33.613 | | | | | | |
| | $d_3$ | 6.488 | $N_2$ | 1.5927 | $\nu_2$ | 35.3 |
| $r_4$  −37.957 | | | | | | |
| | $d_4$ | 1.817 | | | | |
| $r_5$  −33.940 | | | | | | |
| | $d_5$ | 2.595 | $N_3$ | 1.7725 | $\nu_3$ | 49.8 |
| $r_6$  26.100 | | | | | | |
| | $d_6$ | 8.954 | $N_4$ | 1.5407 | $\nu_4$ | 46.8 |
| $r_7$  −34.219 | | | | | | |
| | $d_7$ | 1.298 | | | | |
| $r_8$  −38.141 | | | | | | |
| | $d_8$ | 1.557 | $N_5$ | 1.744 | $\nu_5$ | 44.9 |
| $r_9$  198.025 | | | | | | |
| | $d_9$ | 6.669 | | | | |
| $r_{10}$  448.88 | | | | | | |
| | $d_{10}$ | 11.938 | $N_6$ | 1.4875 | $\nu_6$ | 70.1 |
| $r_{11}$  −24.693 | | | | | | |
| | $d_{11}$ | 0.195 | | | | |
| $r_{12}$  −173.043 | | | | | | |
| | $d_{12}$ | 1.946 | $N_7$ | 1.805 | $\nu_7$ | 41.0 |
| $r_{13}$  130.653 | | | | | | |

11. The invention of claim 1, wherein two of the seven lens elements are cemented to each other.

12. The invention of claim 1, wherein three of the seven lens elements are cemented together.

* * * * *